D McR. LIVINGSTON.

RADIATOR.

APPLICATION FILED JUNE 26, 1919.

Reissued Mar. 30, 1920. 14,826.

Inventor
D McR Livingston
By his Attorneys
Dunn & Goodlett

UNITED STATES PATENT OFFICE.

D McRA LIVINGSTON, OF NEW YORK, N. Y.

RADIATOR.

14,826. Specification of Reissued Letters Patent. Reissued Mar. 30, 1920.

Original No. 1,239,495, dated September 11, 1917, Serial No. 61,995, filed November 17, 1915. Application for reissue filed June 26, 1919. Serial No. 307,013.

*To all whom it may concern:*

Be it known that I, D McRa Livingston, a citizen of the United States, residing in the city of New York, borough of Manhattan, county and State of New York, have invented certain new and useful Improvements in Radiators, of which the following is a full, clear, and concise description.

My invention relates to cellular radiators employed on automobiles. More particularly, the invention relates to a type of radiator in which hexagonal air cells are formed jointly by opposite walls of two corrugated water tubes and by an intermediate radiating unit.

The present invention is characterized by an expanded radiating element in which a single plate is expanded at intervals in opposite directions to form parallel hexagonal cells in the radiating element, the respective cells being separated by and alternating with unexpanded members presenting plane zones, a complete hexagon being formed for the front end of each cell by expanding the end portion of the plate in the same direction as the adjacent part thereof and folding the unexpanded metal back upon itself. When the expanded radiating element is assembled with water tubes, with fins at the salients as hereinafter described, the corrugations and fins of which present alternately three and five sides of a hexagon, said tubes will form jointly with said element, cells at the sides of the expanded cells and in a horizontal row therewith and will form furthermore, with said element, additional cells in horizontal alinement at opposite sides of the plane zones. Among the purposes served by the construction thus briefly characterized, are lightness with strength, and ample radiating surface with a minimum amount of metal, and a facility of assembling the various parts and soldering the same without danger of crushing the walls of the water tubes, as will more clearly appear as the description proceeds.

Reference is to be had to the accompanying drawings forming part of this specification in which similar reference characters indicate corresponding parts in different views.

Figure 1:
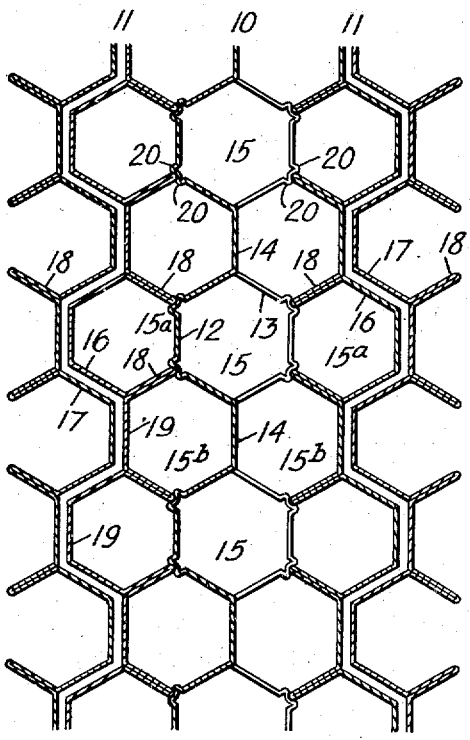
Figure 1 is a transverse vertical section of a portion of the radiating section of a radiator embodying my invention.
Figure 2:
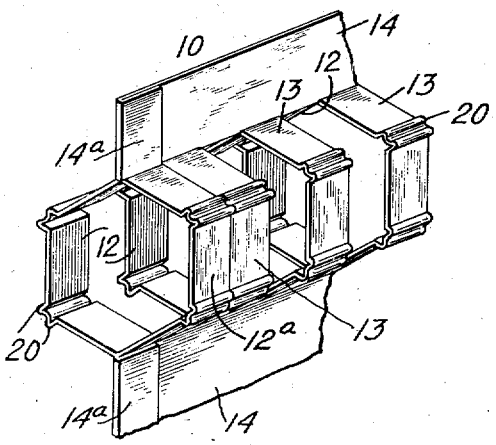
Fig. 2 is a perspective view of my improved radiating element.
Figure 3:
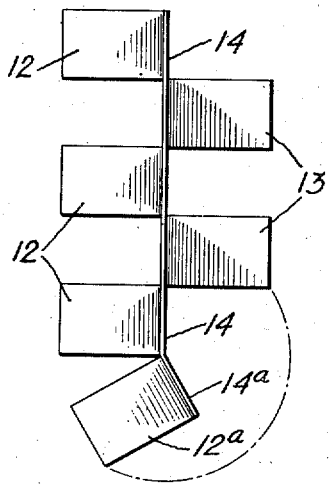
Fig. 3 is a plan view of a radiating section showing the manner in which the front end of the plate is cut and folded back upon itself to form a complete hexagon.

In the illustrated practical embodiment of my invention the numeral 10 indicates my improved radiator element and the numeral 11 designates two water tubes. The improved radiating element is formed from a plate of single thickness and at intervals the same is expanded laterally at opposite sides to produce members 12 and 13, constituting respectively opposite side walls of horizontal cells 15, each member 12 and 13 presenting three sides of a hexagon. The expanded cells 15 thus produced are separated by unexpanded members 14 presenting plane zones running lengthwise with the cells and disposed parallel with each other at the median line of said cells. A complete hexagonal configuration is given to the front of each cell formed by the element 10 by expanding the adjacent members 12 and $12^a$ of said plate in the same direction or on the same side thereof and then folding the unexpanded member 14 over upon itself, as shown at $14^a$.

The respective walls of the water tubes 11 are indicated generally by the numerals 16, 17, and these have radiating fins 18 formed by folding the material on itself. The said fins 18 are disposed alternately in opposite directions at angles to the horizontal at the salients of the walls 16, 17. Thus, at each depression presented by the corrugated water tube at a side toward the radiating element 10, the depression will present three sides of a hexagon and two adjacent converging fins 18 will form two walls of the said hexagon. The tubes and radiating element are assembled so that the remaining wall of the hexagonal cell will be formed by a side of an expanded cell of the radiating element, the terminals of the fins 18 contacting with a wall of an expanded cell at a side thereof, the fins ranging oblique to the horizontal. There will thus be formed jointly by the water tubes and the radiating element at the sides of the expanded cells 15, cells $15^a$. Moreover, there will be formed additional cells $15^b$ at opposite sides of the unexpanded members 14, and jointly by members of adjacent cells 15, the said unexpanded members 14, and the members of the respective water tubes 11. The cells, 15, $15^a$, will aline horizontally with one another and the cells, $15^b$, will also aline horizontally with each other. The cells $15^b$ are separated by the unexpanded members 14 while at the outer sides of said cells $15^b$, the opposed walls of the water tubes will present vertical members 19 which are parallel with the said members 14.

A single element 10 between a pair of water tubes, in contacting directly with the fins 18 of the latter, effectively braces the tubes and provides the maximum number of radiating members. A light construction is obtained with the maximum number of cells, there being a horizontal row of three air cells alternating with a horizontal row of two cells. Also, although obtaining a large number of air cells, an efficient total number of water tubes is employed in a radiator of given size since the lateral projection of the fins 18 is less because of the obliquity of the said fins than would be the lateral projection of horizontally disposed fins.

Furthermore, by constructing or forming the front of each cell as herein explained, the face of a radiator in which my invention is incorporated will have a finished and smooth appearance which would not be otherwise obtainable.

In practice, I prefer to form on the plate 10, projecting members 20, adjacent to and at each side of the salients presented by the expanded members 12, 13. The said projecting members 20 are produced by pressing the material of the plate outwardly to form, in effect, a V-groove, which receives the terminals of the fins 18 on the respective water tubes 11.

I claim:

1. In a radiator, a radiating element of hexagonal cellular construction formed of a plate of single thickness, expanded at intervals alternately in opposite directions to form opposed walls of parallel cells separated by unexpanded zones of a single thickness, the said plate at the front end being returned on itself, the returned portions following the said unexpanded zones and following the lines at one side of each cell.

2. A radiator, including a pair of water tubes having corrugated walls, and pairs of convergent fins and an intermediate radiating element formed of a single plate expanded at spaced intervals in opposite directions forming opposite walls of a plurality of hexagonal cells alternating with noncellular members, the said element and the said water tubes and their convergent fins forming hexagonal cells additional to the expanded cells of the radiating element.

3. In a radiator, a pair of water tubes having corrugated walls, and an intermediate radiating element consisting of a plate of single thickness expanded at spaced intervals in opposite directions to form in said element a series of hexagonal cells separated by intervening unexpanded zones, the walls of the said water tubes adjacent to the said radiating element presenting members forming, with the said element, cells at the sides of the expanded cells, and additional cells at the opposite sides of the said zones.

4. In a radiator, a pair of water tubes having corrugated walls, and an intermediate radiating element consisting of a plate of a single thickness expanded at intervals in opposite directions to form in said element a series of hexagonal cells, separated by intervening plane unexpanded members, the walls of the water tubes adjacent to the said element presenting members forming, with said element, cells at the side of and in horizontal alinement with the expanded cells, and additional cells at the opposite sides of the said plane members, said additional cells being in horizontal alinement.

5. In a radiator, a pair of water tubes having corrugated walls, and an intermediate radiating element consisting of a plate of single thickness expanded at spaced intervals in opposite directions to form in said plate rows of hexagonal expanded cells separated by members presenting plane unexpanded zones, said tubes forming with the said element hexagonal cells at opposite sides of the expanded cells and in horizontal alinement therewith, and additional cells in horizontal alinement with each other at the opposite sides of the said plane zones, those cells in horizontal alinement presenting vertical outer side wall members and vertical separating members parallel with one another.

6. In a radiator, a pair of water tubes having corrugated walls, and an intermediate radiating element consisting of a plate of single thickness expanded at spaced intervals in opposite directions to form in said plate rows of hexagonal expanded cells separated by members presenting plane unexpanded zones, the angular corrugations of said water tubes presenting at each depression thereof members forming three sides of a hexagon and there being fins on said tubes at each salient of the tubes, said fins at the ends of each depression being convergent, said tubes forming with the said element hexagonal cells at opposite sides of the expanded cells and in horizontal alinement therewith, and additional cells in horizontal alinement with each other at the opposite sides of the said plane zones, those cells in horizontal alinement presenting vertical outer side wall members and vertical separating members parallel with one another.

7. An expanded cellular element formed of a plate of single thickness expanded at intervals at opposite directions to form walls at opposite sides of parallel cells separated by unexpanded zones of a single thickness, the said plate at the front end being folded on itself, the folded portion following the lines at one side of each cell.

8. An expanded cellular element formed of a plate of single thickness expanded at intervals in opposite directions to form walls at opposite sides of parallel cells separated by unexpanded zones of a single thickness, the said plate at the front end being folded on itself the full portion following the lines at one side of each cell and following the unexpanded zones.

9. An expanded cellular element consisting of a plate expanded at intervals laterally in opposite directions to present members at opposite sides of rows of cells, the said plate at the front of each cell having wall members directly opposite each other.

10. An expanded cellular element consisting of a plate expanded at intervals laterally in opposite directions to form portions of the cell wall disposed in staggered relation to each other, the front end of said plate being expanded and folded upon itself to obtain the configuration of the complete wall of the cell.

11. A radiator having a cellular element formed from a plate of single thickness expanded at intervals laterally in opposite directions to provide surfaces adapted to cooperate with other surfaces to form the complete cell wall, the surfaces formed by the expansion of said plate being disposed in staggered relation to each other, one end of said plate being expanded in the same direction as the adjacent surface and folded over upon itself to obtain a complete configuration of the cell wall.

D McRA LIVINGSTON.